3,819,678
CYANOALKYLAMINO-PHENYLCARBAMATES
Erwin Nikles, Liestal, Switzerland, assignor to Ciba-
Geigy Corporation, Ardsley, N.Y.
No Drawing. Continuation-in-part of abandoned application Ser. No. 30,940, Apr. 22, 1970. This application Dec. 8, 1971, Ser. No. 206,163
Claims priority, application Switzerland, Apr. 26, 1969, 6,365/69
Int. Cl. C07c 121/78
U.S. Cl. 260—465 D          10 Claims

ABSTRACT OF THE DISCLOSURE

Aminophenylcarbamates, the amino group of which is substituted by at least one lower alkenyl radical substituted by 1 or 2 halogen atoms or by at least one lower alkyl radical substituted by a lower alkoxy, alkylmercapto or nitrile group, are effective pesticides for controlling nematodes, insects and representatives of the order Acarina. They may be used as pesticidal preparations.

CROSS REFERENCE TO RELATED APPLICATIONS

The instant application is a continuation-in-part of application Ser. No. 30,940, filed Apr. 22, 1970, now abandoned.

DISCLOSURE

This invention relates to novel carbamates and to pesticidal preparations containing them.

The present invention provides compounds of the general formula

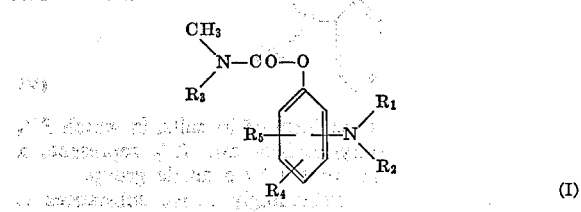

in which $R_1$ represents $C_1$–$C_5$-alkyl, $C_3$–$C_5$-alkenyl or $C_3$–$C_5$-alkinyl radical or has the same meaning as $R_2$, $R_2$ represents a $C_3$–$C_5$-alkenyl radical substituted by 1 or 2 halogen atoms or a $C_1$–$C_4$-alkyl radical substituted by a $C_1$–$C_4$-alkoxy, $C_1$–$C_4$-alkylmercapto or nitrile group; $R_3$ represents a hydrogen atom or a methyl radical and $R_4$ and $R_5$, which may be the same or different, each represents a hydrogen atom or a $C_1$–$C_5$-alkyl radical, and the acid addition salts thereof.

The present invention also provides pesticidal preparations which comprise, as active ingredient, at least one compound of the general formula

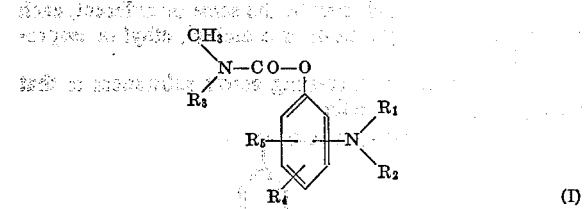

in which $R_1$ represents a $C_1$–$C_5$-alkyl, $C_3$–$C_5$-alkenyl or $C_3$–$C_5$-alkinyl or has the same meaning as $R_2$, $R_2$ represents a $C_3$–$C_5$-alkenyl radical substituted by 1 or 2 halogen atoms or a $C_1$–$C_4$-alkyl radical substituted by a $C_1$–$C_4$-alkoxy, $C_1$–$C_4$-alkylmercapto or nitrile group, $R_3$ represents a hydrogen atom or a methyl radical and $R_4$ and $R_5$, which may be the same or different, each represents a hydrogen atom or a $C_1$–$C_5$-alkyl radical, if desired, together with one or more of the following additives: solvents, diluents, dispersing agents, wetting agents, emulsifiers, thickeners as well as further known pesticides.

Preferably, $R_4$ and $R_5$, which may be the same or different, each represents a hydrogen atom or an alkyl radical having up to 4 carbon atoms.

The new active carbamates on which the pesticidal preparations of the present invention are based can be obtained according to the methods which are customary for the manufacture of this class of substances, for example, by reaction of appropriate phenols, including nitrophenols, with alkali isocyanates or dialkylcarbamic acid chlorides, and, in the case of the nitrophenols, reducing the nitro group to the amino and introducing the radicals $R_1$ and $R_2$.

The carbamates of formula (I) can also be obtained by reaction of appropriately substituted aminophenyl chlorocarbonates or bis-[aminophenyl]-carbonates of the formula

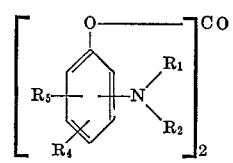

(or bis-[nitrophenyl]-carbonates with reduction of the $NO_2$ group) with appropriate dialkylamines or alkylamines $CH_3$—NH—$R_3$.

If a free $NH_2$ group is present in the phenyl nucleus, its H atoms can be singly or doubly substituted in a known manner, for example with an appropriately esterified p-toluenesulphonic acid or methanesulphonic acid, or with an alkyl halide or an alkenyl halide having, at most, 2 halogen atoms, preferably in the presence of an acid-binding agent. Before forming the carbamate grouping, the phenols on which the compounds are based can also be nitrated or nitrosylated and subsequently converted into mono-N-substituted aminophenols by reductive alkylation with an appropriate ketone or aldehyde in the presence of hydrogen and a suitable catalyst for example, palladium/charcoal, under pressure. It is also possible to apply this mono-N-substitution directly to aminophenols. The further replacement of the second H atom of the group takes place as mentioned initially.

The active ingredients can be present not only as the free base but also in the form of their salts. Inorganic and organic acids can be used for the formation of the salt, for example, sulphuric acid, hydrochloric acid, hydrobromic acid, phosphoric acid, sulphamic acid, citric acid, glycollic acid, ethionic acid, methanesulphonic acid, toluene-sulphonic acid, p-aminobenzoic acid, maleic acid and numerous others. Acid salts, for example, the acid sulphate, are distinguished by their especially favourable stability.

The compounds of formula (I) show a broad biocidal action and can be employed for combatting very diverse animal pests. Amongst the animal pests, there should be mentioned nematodes, insects and representatives of the order Acarina, for example, mites and ticks, as well as all their stages of development, such as eggs, larvae and chrysales or pupae.

The compounds of formula (I) can, for example, be used against all harmful insects, for example, against leafhopper in rice cultures, against aphids, such as the green peach aphid (*Myzus persicae*) and the bean aphid (*Doralis fabae*); shield lice such as *Aspidiotus hederae*, *Lecanium hesperidium* and *Pseudococcus maritimus*; Thysanoptera such as *Herciniothrips femoralis*, and bugs such as the beet bug (*Piesma qudrata*) or the bed bug (*Cimex lectularius*), butterfly caterpillars, such as *Plutella maculipennis* and *Lymantria dispar;* beetles such as the granary weevil (*Calandra granaria*) or the Colorado beetle (*Leptinotarsa decemlineata*), but also varieties which live in soil, such as wireworms (*Agriotes sp.*) or cockchafer grubs (*Melolontha melolontha*); Orthoptera such as the German cockroach (*Blattella germanica*) or the house cricket (*Gryllus domesticus*); termites, such as Reticulitermes; Hymenoptera, such as ants; Diptera such as the vinegar fly (*Drosophila melanogaster*), the Mediterranean fruit fly (*Ceratitis capitata*) and the house fly (*Musca domestica*) as well as gnats (for example *Aedes aegypti* and *Anopheles stephensi*).

In respect of contact action, the compounds of the present invention are greatly superior to the known active substance N-methyl-α-naphthylcarbamate.

The compounds of the formula (I) are also especially effective in combatting representatives of the order Acarina, for example, Eulaelaps, Echniolaelaps, Laelaps, Haemogamasus, Dermanyssus, Ornithenyssus, Allodermanyssus, especially *Allodermanyssus sanguineus*, Pneumonyssus, Amblyomma, Aponomma, Boophilus, Dermacentor, Haemophysalis, Hyalomma, Ixodes, Margaropus, Rhipicephalus, Ornithodorus; Otobius, Cheyletidae, for example, Cheyletus, Psorergates, Demodicidae, Trombiculidae, for example, Trombicula, Eutrombicula, Schöngastia, Acomataeurus, Neoschöngastia, Euschöngastia, Sarcoptiformes, for example, Notoedres, Sarcoptes, Knemidokoptes, Psoroptidae, for example, Psoroptes, Chorioptes, Octodectes or Tetranychidae, for example, *Tetranychus telarius*, *Tetranychus ureticae* and the like.

In general, the active substances of formula (I), by themselves or in agents, show a high contact poison and bait poison action against insects, nematodes and pests of the order Acarina.

Their broad action spectrum makes them, above all, suitable for combatting pests in the following cultures: cotton, rice, maize, kernel fruit and stone fruit, and lucerne. They act against the Lepidoptera, Coleoptera, Rhynchota and Hymenoptera which become particularly dangerous to these cultures. Attention should be drawn especially to the excellent action against larvae of noctuids, such as *Prodenia litura* and *Prodenia ornithogalli*, and weevils such as *Anthonomus grandis*, which occur on cotton and other cultures.

When used in plant protection in a concentration which does not permit any phytotoxic phenomena to arise, the active substances of formula (I) also show a good action against harmful micro-organisms, for example against fungi, for example, *Alternaria solani*, *Phytophthora infestans* and *Septoria apii*, as well as against microorganisms, for example, varieties of Aspergillus, and also molluscs, especially gastropodes, which are known as schistosome carriers.

The advantageous toxicities towards warmblooded animals of the compounds according to the invention should be highlighted.

Preferred are the compounds of the general formula

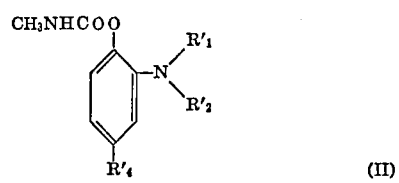
(II)

wherein $R'_1$ represents a $C_1$–$C_4$-alkyl radical or has the same, meaning as $R'_2$, $R'_2$ represents a $C_3$–$C_5$-alkenyl radical substituted by a halogen atom or a $C_1$–$C_4$-alkyl radical substituted by a $C_1$–$C_4$-alkoxy or nitrile group and $R'_4$, represents a hydrogen atom or a methyl, ethyl or isopropyl radical.

Another group of preferred compounds is that of the general formula

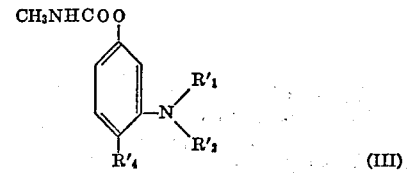
(III)

wherein $R'_1$ represents a $C_1$–$C_4$-alkyl radical or has the same, meaning as $R'_2$, $R'_2$ represents a $C_3$–$C_5$-alkenyl radical substituted by a halogen atom or a $C_1$–$C_4$-alkyl radical substituted by a $C_1$–$C_4$-alkoxy or nitrile group and $R'_4$, represents a hydrogen atom or a methyl, ethyl or isopropyl radical.

Another group of preferred compounds is that of the general formula

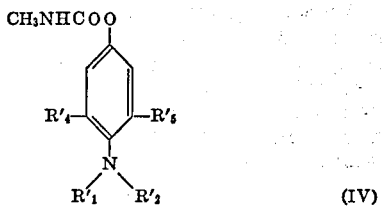
(IV)

wherein $R'_1$ represents a $C_1$–$C_4$-alkyl radical or has the same, meaning as $R'_2$, $R'_2$ represents a $C_3$–$C_5$-alkenyl radical substituted by a halogen atom or a $C_1$–$C_4$-alkyl radical substituted by a $C_1$–$C_4$-alkoxy or nitrile group and $R'_4$ and $R'_5$ each represents a hydrogen atom or a methyl, ethyl or isopropyl radical.

Special interest attaches to those compounds of the formula

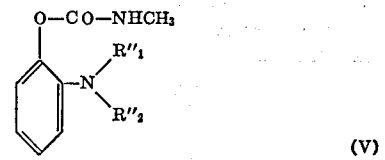
(V)

as the free base or in the form of its salts, in which $R''_1$ represents a $C_1$–$C_4$-alkyl radical and $R''_2$ represents a $C_1$–$C_4$-alkyl radical substituted by a nitrile group.

Another group of outstandingly active substances is that having the general formula

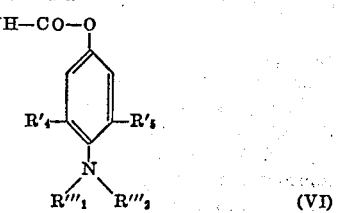
(VI)

in which $R'''_1$ represents a $C_1$–$C_4$-alkyl radical or has the same meaning as $R'''_2$, $R'''_2$ represents a $C_3$–$C_5$-alkenyl radical substituted by 1 halogen, especially a chlorine atom and $R'_4$ and $R'_5$, which may be the same or different, each represents a hydrogen atom or a methyl, ethyl or isopropyl radical.

Another group of interesting active substances is that having the general formula

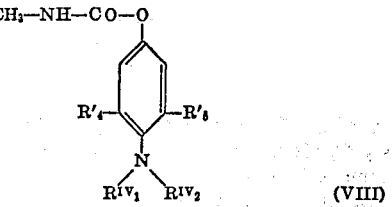
(VIII)

in which $R^{IV}_1$ represents a $C_1$–$C_4$-alkyl radical or has the same meaning as $R^{IV}_2$, $R^{IV}_2$ represents a $C_1$–$C_4$-alkyl radical substituted by a nitrile group and $R'_4$ and $R'_5$, which may be the same of different, each represents a hydrogen atom or a methyl, ethyl or isopropyl radical.

A further group of interesting active substances in that having the general formula

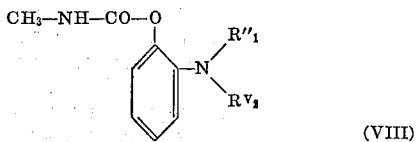

(VIII)

in which $R''_1$, is a $C_1$–$C_4$-alkyl radical and $R^V_2$ is a $C_1$–$C_4$-alkyl radical substituted by a methoxy radical.

For combatting special pests, compounds of the general formula

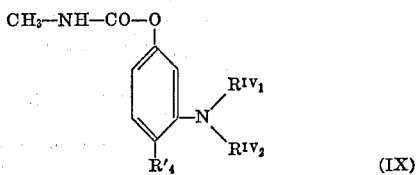

(IX)

in which $R^{IV}_1$ represents a $C_1$–$C_4$-alkyl radical or has the same meaning as $R^{IV}_2$, $R^{IV}_2$ represents a $C_1$–$C_4$-alkyl radical substituted by a nitrile group, and $R'_4$ represents a hydrogen atom or a methyl, ethyl or isopropyl radical, prove effective.

Particularly active compounds are:

(1) 4-[Bis(γ-chlorallyl)amino]-3-methyl-phenyl-N-methylcarbamate, melting point 72–78° C.,
(2) 4-[Bis(β-chlorallyl)amino]-3-methyl-phenyl-N-methylcarbamate, melting point 52–58° C.,
(3) 4 - [Bis(γ-chlorallyl)-amino]-3,5-dimethyl-phenyl-N-methylcarbamate,
(4) 4 - [Bis(β-chlorallyl)amino]-3,5-dimethyl-phenyl-N-methylcarbamate, melting point 85–93° C.,
(5) 4 - [Bis(-γ-dichlorallyl)amino]-3-methyl-phenyl-N-methylcarbamate,
(6) 4 - [Bis(β,γ-dichlorallyl)amino]-3,5-dimethyl-phenyl-N-methylcarbamate,
(7) 4 - [Bis(β-chlorallyl)amino]-3-isopropyl-phenyl-N-methylcarbamate, melting point 81–83° C.,
(8) 4 - [Bis(γ-chlorallyl)amino]-3-isopropyl-phenyl-N-methylcarbamate (oil),
(9) 4 - [Bis(γ-chlorallyl)amino]-3-ethyl-phenyl-N-methylcarbamate,
(10) 4 - [Bis(β-methoxyethyl)amino]-3-methyl-phenyl-N-methylcarbamate, viscous oil,
(11) 4 - [Bis(β-methoxyethyl)amino]-3,5-dimethyl-phenyl-N-methylcarbamate, oil,
(12) 4 - [Bis(β-methoxyethyl)amino]-3-isopropyl-phenyl-N-methylcarbamate, oil,
(13) 4 - [Bis(β - methylmercaptoethyl)amino]-3-methyl-phenyl-N-methylcarbamate,
(14) 4 - [Bis(β-methylmercaptoethyl)amino]-3,5-dimethyl-phenyl-N-methylcarbamate,
(15) 4 - [Bis(β-methylmercaptoethyl)amino]-3-isopropyl-phenyl-N-methylcarbamate,
(16) 4 - (γ-Chlorallyl-methyl-amino)-3-methyl-phenyl-N-methylcarbamate,
(17) 4 - (β-Chlorallyl-methyl-amino)-3-methyl-phenyl-N-methylcarbamate,
(18) 4 - [Bis(γ-chlorallyl)amino]-3-methyl-phenyl-N,N-dimethylcarbamate,
(19) 4 - (β-Methoxyethyl-methyl-amino)-3-methyl-phenyl-N-methylcarbamate, oil,
(20) 4 - (β-Methoxyethyl-methyl-amino)-3,5-dimethyl-phenyl-N-methylcarbamate (oil),
(21) 4-(Methyl-β-methylmercaptoethyl-amino)-3,5-dimethylphenyl-N-methylcarbamate, oil,
(22) 3-Isopropyl-4(β-methoxyethyl-methyl-amino)-phenyl-N-methylcarbamate, oil,
(23) 3-Isopropyl-4(methyl-β-methylmercaptoethyl-amino)-phenyl-N-methylcarbamate, oil,
(24) 4-[Bis(β-cyanethyl)amino]-3-methyl-phenyl-N-methylcarbamate, melting point 110–113° C.,
(25) 4-(β-Cyanethyl-methyl-amino)-3-methyl-phenyl-N-methylcarbamate, oil,
(26) 4-(β-Cyanethyl-methyl-amino)-3,5-dimethyl-phenyl-N-methylcarbamate, melting point 63–67° C.,
(27) 4-[Bis(β-cyanethyl)amino]-3,5-dimethyl-phenyl-N-methylcarbamate, oil,
(28) 3-(γ-Chlorallyl-methyl-amino)-phenyl-N-methylcarbamate, oil,
(29) 3-(γ-Chlorallyl-isopropyl-amino)-phenyl-N-methylcarbamate, oil,
(31) 3-(Isopropyl-β-methoxyethyl-amino)-phenyl-N-methylcarbamate,
(31) 3-(Isopropyl-β-methoxyethyl-amino)-phenyl-N-methylcarbamate, oil,
(32) 3-(β-Methoxyethyl-methyl-amino)-phenyl-N-methylcarbamate, oil,
(33) 3-(Ethyl-β-methoxyethyl-amino)-phenyl-N-methylcarbamate, oil,
(34) 3-(β-Cyanethyl-isopropylamino)-phenyl-N-methylcarbamate, yellow oil,
(35) 3-(β-Cyanethyl-methyl-amino)-phenyl-N-methylcarbamate, yellow oil,
(36) 3-(Allyl-β-cyanethyl-amino)-phenyl-N-methylcarbamate,
(37) 3-(β-Cyanethyl-propargyl-amino)-phenyl-N-methylcarbamate,
(38) 2-(γ-Chlorallyl-methyl-amino)-phenyl-N-methylcarbamate, oil,
(39) 2-(γ-Chlorallyl-ethyl-amino)-phenyl-N-methylcarbamate,
(40) 2-(γ-Chlorallyl-isopropyl-amino)-phenyl-N-methylcarbamate,
(41) 2-[Bis(γ-chlorallyl)amino]-phenyl-N-methylcarbamate,
(42) 2-(β-Chlorallyl-methyl-amino)-phenyl-N-methylcarbamate,
(43) (β,γ-Dichlorallyl-methyl-amino)-phenyl-N-methylcarbamate,
(44) 2-(β-Chlorallyl-isopropyl-amino)-phenyl-N-methylcarbamate,
(45) 2-(Allyl-γ-chlorallyl-amino)-phenyl-N-methylcarbamate,
(46) 2-(γ-Chlorallyl-propargyl-amino)-phenyl-N-methyl-carbamate,
(47) 2-(β-Methoxyethyl-methyl-amino)-phenyl-N-methylcarbamate, oil,
(48) 2-(β-Methoxyethyl-propargyl-amino)-phenyl-N-methylcarbamate,
(49) 2-(Allyl-β-methoxyethyl-amino)-phenyl-N-methylcarbamate, oil,
(50) 2-(Isopropyl-β-methoxyethyl-amino)-phenyl-N-methylcarbamate, oil,
(51) 2-(sec.Butyl-β-methoxyethyl-amino)-phenyl-N-methylcarbamate,
(52) 2-(β-Chlorallyl-ethyl-amino)-phenyl-N-methylcarbamate, oil,
(53) 2-(Methyl-β-methylmercaptoethyl-amino)-phenyl-N-methylcarbamate, oil,
(54) 2-(Ethyl-β-methylmercaptoethyl-amino)-phenyl-N-methylcarbamate,
(55) 2-(Isopropyl-β-methylmercaptoethyl-amino)-phenyl-N-methylcarbamate,
(56) 2-(Methyl-β-methylmercaptoethyl-amino)-phenyl-N,N-dimethylcarbamate,
(57) 2-(β-Cyanethyl-methyl-amino)-phenyl-N-methylcarbamate, melting point 52–55° C.,
(58) 2-(Cyanomethyl-methyl-amino)-phenyl-N-methylcarbamate,
(59) 2-(β-Cyanethyl-ethyl-amino)-phenyl-N-methylcarbamate, melting point 33–36° C.,
(60) 2-(β-Cyanethyl-isopropyl-amino)-phenyl-N-methylcarbamate, melting point 63° C.,

(61) 2-(Cyanomethyl-isopropyl-amino)-phenyl-N-methylcarbamate,
(62) 2-(Allyl-β-cyanethyl-amino)-phenyl-N-methylcarbamate,
(63) 2-(β-Cyanethyl-propargyl-amino)-phenyl-N-methylcarbamate,
(64) 2-(β-Methoxyisopropyl-methylamino)-phenyl-N-methylcarbamate,
(65) 4-[Bis(β-cyanethyl)-amino]-3-isopropyl-phenyl-N-methylcarbamate, oil,
(66) 4-(β-Cyanethyl-methyl-amino)-3-isopropyl-phenyl-N-methylcarbamate, oil,
(67) 4-(β-Cyanethyl-ethyl-amino)-3-isopropyl-phenyl-N-methylcarbamate, oil,
(68) 4-(γ-Chlorallyl-ethyl-amino)-3-methyl-phenyl-N-methylcarbamate, oil,
(69) 4-(γ-Chlorallyl-ethyl-amino)-3-isopropyl-phenyl-N-methylcarbamate, oil,
(70) 4-(Cyanomethyl-methyl-amino)-3-methyl-phenyl-N-methylcarbamate, oil,
(71) 4-(Cyanomethyl-methyl-amino)-3-isopropyl-phenyl-N-methylcarbamate, oil,
(72) 4-(Cyanomethyl-methyl-amino)-3,5-dimethyl-phenyl-N-methylcarbamate, oil,
(73) 4-(β-Chlorallyl-methyl-amino)-3,5-dimethyl-phenyl-N-methylcarbamate, melting point 80° C.,
(74) 4-(γ-Chlorallyl-methyl-amino)-3,5-dimethyl-phenyl-N-methylcarbamate, oil,
(75) 4-[Bis(γ-chlorallyl)-amino]-3-sec.butyl-phenyl-N-methylcarbamate, oil,
(76) 3-(Cyanomethyl-isopropyl-amino)-phenyl-N-methylcarbamate, dark oil,
(77) 3-(Cyanomethyl-methyl-amino)-phenyl-N-methylcarbamate, viscous oil,
(78) 3-(Cyanomethyl-methyl-amino)-4-methyl-phenyl-N-methylcarbamate, oil,
(79) 3-(β-Cyanethyl-methyl-amino)-4-methyl-phenyl-N-methylcarbamate, oil,
(80) 3-[Bis(β-cyanethyl)-amino]-phenyl-N-methylcarbamate, melting point 150–153° C.,
(81) 3-(β-Cyanethyl-ethyl-amino)-phenyl-N-methylcarbamate, oil,
(82) 3-(β-Chlorallyl-isopropyl-amino)-phenyl-N-methylcarbamate, melting point 88–92° C.,
(83) 3-(Cyanomethyl-isopropyl-amino)-4-methyl-phenyl-N-methylcarbamate, oil,
(84) 3-(Cyanomethyl-ethyl-amino)-4-methyl-phenyl-N-methylcarbamate, yellow oil,
(85) 3-(β-Cyanethyl-ethyl-amino)-4-methyl-phenyl-N-methylcarbamate, yellow oil,
(86) 3-(γ-Chlorallyl-isopropyl-amino)-4-methyl-phenyl-N-methylcarbamate, yellow viscous oil,
(87) 3-(γ-Chlorallyl-ethyl-amino)-4-methyl-phenyl-N-methylcarbamate, viscous oil,
(88) 3-(γ-Chlorallyl-methyl-amino)-4-methyl-phenyl-N-methylcarbamate, oil,
(89) 3-Bis(β-cyanethyl)-amino-4-methyl-phenyl-N-methylcarbamate, oil,
(90) 2-(Allyl-cyanomethyl-amino)-phenyl-N-methylcarbamate, melting point 112–113° C.,
(91) 2-(sec.Butyl-cyanomethyl-amino)-phenyl-N-methylcarbamate, oil,
(92) 2-[Bis(β-cyanoethyl)amino]-phenyl-N-methylcarbamate, reddish oil,
(93) 2-(α-Cyanethyl-methyl-amino)-phenyl-N-methylcarbamate, viscous oil,
(94) 3-(α-Cyanethyl-methyl-amino)-phenyl-N-methylcarbamate, viscous oil,
(95) 2-(Methyl-methylcercaptomethylamino)-phenyl-N-methylcarbamate, oil,
(96) 2-(Methoxymethyl-methyl-amino)-phenyl-N-methylcarbamate, oil,
(97) 4-[Bis(γ-chlorallyl)amino]-2,3-dimethyl-phenyl-N-methylcarbamate, oil,
(98) 4-[Bis(β-cyanethyl)-amino]-2,3-dimethyl-phenyl-N-methylcarbamate, oil,
(99) 4-[Bis(γ-chlorallyl)-amino]-3-(α-methylbutyl)-phenyl-N-methylcarbamate, viscous oil,
(100) 4-[Bis(γ-chlorallyl)-amino]-3-(α-ethylpropyl)-phenyl-N-methylcarbamate, viscous oil,
(101) 2-(Cyanomethyl-ethyl-amino)-phenyl-N-methylcarbamate, melting point 85–86° C.,
(102) 2-(Cyanomethyl-n-propyl-amino)-phenyl-N-methylcarbamate, melting point 55–65° C.,
(103) 2-(Cyanomethyl-n-butyl-amino)-phenyl-N-methylcarbamate, melting point 72–76.5° C.,
(104) 2-(Cyanomethyl-propargyl-amino)-phenyl-N-methylcarbamate,
(105) 3-(Cyanomethyl-n-butyl-amino)-phenyl-N-methylcarbamate, melting point 107–109.5° C.,
(106) 3-[Bis(β-chlorallyl)-amino]-4-methyl-phenyl-N-methylcarbamate, oil,
(107) 2-(β-Chlorallyl-ethyl-amino)-4-methylphenyl-N-methylcarbamate, red oil,
(108) 2-(β-Chlorallyl-methyl-amino)-4-methylphenyl-N-methylcarbamate, melting point 51.5–60° C.,
(109) 2-(γ-Chlorallyl-methyl-amino)-4-methylphenyl-N-methylcarbamate, oil,
(110) 2-(β-Chlorallyl-isopropyl-amino)-4-methyl-phenyl-N,N-dimethylcarbamate, oil,
(111) 4-[Bis(γ-Chlorallyl)-amino]-3,5-dimethyl-phenyl-N,N-dimethylcarbamate, oil,
(112) 4-(γ-Chlorallyl-methyl-amino)-3,5-dimethyl-phenyl-N,N-dimethylcarbamate, oil.

The new agents can be employed in the most diverse manner and in various forms, for example in the form of sprays, dusting powders, fly dishes or strips which are impregnated with a solution of the active substances.

In order to manufacture directly sprayable solutions of the compounds of general formula (I), it is for example possible to use mineral oil fractions of high to medium boiling range, such as diesel oil or kerosene, coal tar oil and oils of vegetable or animal origin, as well as hydrocarbons, such as alkylated naphthalenes or tetrahydronaphthalene, optionally with the use of xylene mixtures, cyclohexanols, ketones and also chlorinated hydrocarbons such as trichlorethane and tetrachlorethane, trichlorethylene or trichlorebenzenes and tetrachlorobenzenes. Advantageously, organic solvents of boiling point above 100° C. are used.

Aqueous application forms are particularly appropriately prepared from emulsion concentrates, pastes or wettable spraying powders by adding water. Possible emulsifiers or dispersing agents are non-ionic products, for example condensation products of aliphatic alcohols, amines or carboxylic acids having a long-chain hydrocarbon radical of about 10 to 20 carbon atoms with ethylene oxide, such as the condensation product of octadecyl alcohol and 25 to 30 mols of ethylene oxide, or that of technical oleylamine and 15 mols of ethylene oxide or that of dodecylmercaptan and 12 mols of ethylene oxide. Amongst the anionic emulsifiers which can be employed, there may be mentioned: the sodium salt of dodecyl alcohol sulphuric acid ester, the sodium salt of dodecylbenzenesulphonic acid, the potassium or triethanolamine salt of oleic acid or of abietic acid or of mixtures of these acids, or the sodium salt of a petroleum-sulphonic acid. Possible cationic dispersing agents are quaternary ammonium compounds, such as cetylpyridinium bromide, or dihydroxyethylbenzyldodecylammonium chloride.

In order to manufacture dusting agents and scattering agents, talc, kaolin, bentonite, calcium carbonate or calcium phosphate, but also charcoal, cork powder, wood flour and other materials of vegetable origin, can be employed as solid carriers. Preparations in a granular form are also very suitable.

Such granules can be manufactured very simply by dissolving an active substance of formula (I) in an organic solvent, applying the solution thus obtained to a granular mineral, for example attapulgite, SiO$_2$, granicalcium, bentonite and the like and then again evaporating the organic solvent.

It is also possible to use polymer granules. They can be manufactured by mixing the active substances of formula (I) with polymerisable compounds (urea/formaldehyde, dicyandiamide/formaldehyde, melamine/formaldehyde or others), after which a mild polymerisation is carried out, which leaves the active substances unaffected, and the granulation is effected whilst gel formation is still taking place. A more advantageous method is to impregnate finished, porous polymer granules (urea/formaldehyde, polyacrylonitrile, polyesters or others) having a definite surface area and an advantageous predeterminable adsorption/desorption ratio with the active substances, for example in the form of their solutions (in a low-boiling solvent) and to remove the solvent.

Such polymer granules can, in the form of microgranules with bulk densities of preferably 300 g./litre to 600 g./litre, also be applied with the aid of dusting devices. The dusting can be carried out over large areas of crops with the aid of aircraft.

Granules are also obtainable by compacting the carrier material with the active substances and additives and subsequent comminution. The various use forms can, in the customary manner, be provided with additions of substances which improve the distribution, the adhesion, the rain resistance or the penetrating power; as such substances there may be mentioned: fatty acids, resin, glue, casein or alginates.

The concentration of the agents employed can vary within wide limits depending on the nature of the use. It is generally 0.01 percent by weight to 20 percent by weight for more dilute agents, whilst more concentrated agents contain 20 percent by weight to 98 percent by weight of active substance. Very highly concentrated preparations are, say, used in the so-called ULV technique (ultra-low volume) with minimal amounts of additives. The ULV technique is used with very finely atomising spraying devices, preferably with the aid of aircraft.

The action of the carbamates according to the invention can be further increased by synergistic agents. Suitable materials for this purpose are, for example, Sesamine, Sesamex, piperonylcyclonene, piperonyl butoxide, piperonal-bis[2-(2 - butoxyethoxy)ethyl]acetate, sulphoxides, propyl isome, N-(2-ethylhexyl)-5-norbornene-2,3-dicarboxyamide, octachlorodipropyl - ether, 2-nitrophenylpropargyl-ether and 2,4,5-trichlorophenyl-propargyl-ether.

The active substances according to the invention can be employed in agents by themselves or together with customary pesticides, especially insecticides, acaricides, nematocides, bactericides and fungicides.

The following list gives some examples relating to the combination of suitable insecticides, acaricides and nematocides.

PHOSPHORIC ACID DERIVATIVES

Bis-O,O-diethylphosphoric acid anhydride (TEPP)
O,O,O,O-Tetrapropyldithiopyrophosphate
Dimethyl(2,2,2-trichloro-1-hydroxyethyl)phosphonate Trichrorfon)
1,2-Dibromo-2,2-dichlorethyldimethylphosphate (Naled)
2,2-Dichlorovinyldimethylphosphate (Dichlorfos)
2-Methoxycarbamyl-1-methylvinyldimethylphosphate (Mevinphos)
Dimethyl-1-methyl-2-(methylcarbamoyl)vinylphosphate cis (Monocrotophos)
3-(Dimethoxyphosphinyloxy)-N-methyl-N-methoxy-cis-crotonamide
3-(Dimethoxyphosphinyloxy)-N,N-dimethyl-cis-crotonamide (Dicrotophos)
2-Chloro-2-diethylcarbamoyl-1-methylvinyldimethylphosphate (Phosphamidon)
O,O-Diethyl-O(or S)-2-(ethylthio)-ethylthiophosphate Demeton)
S-Ethylthioethyl-O,O-dimethyl-dithiophosphate (Thiometon)
O,O-Diethyl-S-ethylmercaptomethyldithiophosphate (Phorate)
O,O-Diethyl-S-2-[(ethylthio)ethyl]dithiophosphate (Disulfoton)
O,O-Dimethyl-S-2-(ethylsulphinyl)ethylthiophosphate (Oxydemetonmethyl)
O,O-Dimethyl-S-(1,2-dicarbethoxyethyl)dithiophosphate (Malathion)
O,O,O,O-Tetraethyl-S,S'-methylene-bis-[dithiophosphate] (Ethion)
O-Ethyl-S,S-dipropyldithiophosphate
O,O-Dimethyl-S-(N-methyl-N-formylcarbamoylmethyl)-dithiophosphate (Formotion)
O,O-Dimethyl-S-(N-methylcarbamoylmethyl)dithiophosphate (Dimethat)
O,O-Dimethyl-S-(N-ethylcarbamoylmethyl)dithiophosphate (Ethoat-Methyl)
O,O-Diethyl-S-(N-isopropylcarbamoylmethyl)-dithiophosphate (Prothoat)
S-N-(1-Cyano-1-methylethyl)carbamoylmethyldiethyl-thiolphosphate (Cyanthoat)
S-(2-Acetamioethyl)-O,O-dimethyldithiophosphate
Hexamethylphosphoric acid triamide (HEMPA)
O,O-Dimethyl-O-p-nitrophenylthiophosphate (Parathion-Methyl)
O,O-Diethyl-O-p-nitrophenylthiophosphate (Parathion)
O-Ethyl-O-p-nitrophenylthiophosphonate (EPN)
O,O-Dimethyl-O-(4-nitro-m-tolyl)thiophosphate (Fenitrothion)
O,O-Dimethyl-O-(2-chloro-4-nitrophenyl)thiophosphate (Dicapthon)
O,O-Dimethyl-O-p-cyanophenylthiophosphate (Cyanox)
O-Ethyl-O-p-cyanophenylphenylthiophosphonate
O,O-Diethyl-O-2,4-dichlorophenylthiophosphate (Dichrofenthion)
O-2,4-Dichlorophenyl-O-methylisopropylamidothiophosphate
O,O-Dimethyl-O-2,4,5-trichlorophenylthiophosphate (Ronnel)
O-Ethyl-O-2,4,5-trichlorophenylethylthiophosphonate (Trichloronat)
O,O-Dimethyl-O-2,5-dichloro-4-bromophenylthiophosphate (Bromophos)
O,O-Diethyl-O-2,5-dichloro-4-bromophenylthiophosphate Bromophos-Ethyl)
O,O-Dimethyl-O-(2,5-dichloro-4-iodophenyl)-thiophosphate (Iodofenphos)
4-tert. Butyl-2-chlorophenyl-N-methyl-O-methylamindophosphate (Crufomat)
Dimethyl-p-(methylthio)phenylphosphate
O,O-Dimethyl-O-(3-methyl-4-methylmercaptophenyl) thiophosphate (Fenthion)
Isopropylamino-O-ethyl-O-(4-Methylmercapto-3-methylphenyl)phosphate
O,O-Diethyl-O-p-[(methylsulphinyl)phenyl]-thiophosphate (Fensulfothion)
O,O-Dimethyl-O-p-sulphamidophenylthiophosphate
O-[p-(Dimethylsulphamido)phenyl]O,O-dimethylthiophosphate (Famphur)
O,O,O'O'-Tetramethyl-O,O'-thiodi-p-phenylenethiophosphate
O-(p-Chlorophenylazophenyl)-O,O-dimethylthiophosphate (Azothoat)
O-Ethyl-S-phenyl-ethyldithiophosphonate
O-Ethyl-S-4-chlorophenyl-ethyldithiophosphonate
O-Isobutyl-S-p-chlorophenyl-ethyldithiophosphonate
O,O-Dimethyl-S-p-chlorophenylthiophosphonate
O,O-Dimethyl-S-(p-chlorophenylthiomethyl)-dithiophosphate
O,O-Diethyl-p-chlorophenylmercaptomethyl-dithiophosphate (Carbophenothion)

O,O-Diethyl-S-p-chlorophenylthiomethyl-thiophosphate
O,O-Dimethyl-S-(carbethoxy-phenylmethyl)dithiophosphate (Phenothoat)
O,O-Diethyl-S-(carbofluorethoxy-phenylmethyl)-dithiophosphate
O,O-Dimethyl-S-(carbisopropoxy-phenylmethyl)-dithiophosphate
O,O-Dimethyl-O-(alpha-methylbenzyl-3-hydroxycrotonyl)phosphate,
2-Chloro-1-(2,4-dichlorophenyl)vinyl-diethylphosphate (Chlorfenvinphos)
2-Chloro-1-(2,4,5-trichlorophenyl)vinyl-dimethylphosphate
O-2-Chloro-1-(2,5-dichlorophenyl)vinyl-O,O-diethylthiophosphate
Phenylglyoxylonitriloxime-O,O-diethylthiophosphate (Phoxim)
O,O-Diethyl-O-(3-chloro-4-methyl-2-oxo-2H-1-benzopyran-7-yl)-thiophosphate (Coumaphos)
O,O-Diethyl-7-hydroxy-3,4-tetramethylene-coumarinyl-thiophosphate (Coumithoat)
2,3-p-Dioxanedithiol-S,S-bis(O,O-diethyldithiophosphate) (Dioxathion)
2-Methoxy-4-H-1,3,2-benzodioxaphosphorine-2-sulphide
O,O-Diethyl-O-(5-phenyl-3-isooxyzolyl)-thiophosphate
S-[(6-Chloro-2-oxo-3-benzoxazolinyl)methyl]O,O-diethyldithiophosphate (Phosalon)
2-(Diethoxyphosphinylimino)-4-methyl-2,3-dithiolane
O,O-Dimethyl-S-[2-methoxy-1,3,4-thiadiazol-5-(4H)-onyl-(4)-methyl]dithiophosphate
Tris-(2-methyl-1-aziridinyl)-phosphine-oxide (METEPA)
O,O-Dimethyl-S-phthalimidomethyl-dithiophosphate
S-(2-Chloro-1-phthalimidoethyl)-O,O-diethyldithiophosphate
N-Hydroxynaphthalimido-diethylphosphate
Dimethyl-3,5,6-trichloro-2-pyridylphosphate
O,O-Dimethyl-O-(3,5,6-trichloro-2-pyridyl)thiophosphate
O,O-Diethyl-O-(3,5,6-trichloro-2-pyridyl)thiophosphate
O,O-Diethyl-O-2-pyrazinylthiophosphate (Thionazin)
O,O-Diethyl-O-(2-isopropyl-4-methyl-6-pyrimidyl)thiophosphate (Diazinon)
O,O-Diethyl-O-(2-quinoxylyl)thiophosphate
O,O-Dimethyl-S-(4-oxo-1,2,3-benzotriazin-3(4H)-ylmethyl)dithiophosphate (Azinphosmethyl)
O,O-Diethyl-S-(4-oxo-1,2,3-benzotriazin-3(4H)-ylmethyl)dithiophosphate (Azinphosethyl)
S-[(4,6-Diamino-s-triazin-2-yl)methyl]-O,O-dimethyl-dithiophosphate (Menazon)
S-[2-(Ethylsulphonyl)ethyl]dimethylthiolphosphate (Dioxydemeton-S-Methyl)
Diethyl-S-[2-(ethylsulphinyl)ethyl]dithiophosphate (Oxydisulfoton)
Bis-O,O-diethylthiophosphoric acid anhydride (Sulfotep)
Dimethyl-1,3-di(carbomethoxy)-1-propen-2-yl-phosphate
Dimethyl-(2,2,2-trichloro-1-butyroyloxyethyl)phosphonate (Butonat)
O,O-Dimethyl-O-(2,2-dichloro-1-methoxy-vinyl)phosphate
O,O-Dimethyl-O-(3-chloro-4-nitrophenyl)thiophosphate (Chlorthion)
O,O-Dimethyl-O-(or S)-2-(ethylthioethyl)thiophosphate (Demeton-S-Methyl)
Bis-(dimethylamido)fluorophosphate (Dimefox)
2-(O,O-Dimethyl-phosphoryl-thiomethyl)-5-methoxy-pyrone-4
3,4-Dichlorobenzyl-triphenylphosphonium chloride
Dimethyl-N-methoxymethylcarbamoylmethyl-dithiophosphate (Formocarbam)
O,O-Diethyl-O-(2,2-dichloro-1-chlorethoxyvinyl)phosphate
O,O-Dimethyl-O-(2,2-dichloro-1-chlorethoxyvinyl)phosphate O-Ethyl-S,S-diphenyldithiolphosphate
O-Ethyl-S-benzyl-phenyldithiophosphonate
O,O-Diethyl-S-benzyl-thiolphosphate
O,O-Dimethyl-S-(4-chlorophenylthiomethyl)dithiophosphate (Methylcarbophenothion)
O,O-Dimethyl-S-(ethylthiomethyl)dithiophosphate
Diisopropylaminofluorophosphate (Mipafox)
O,O-Dimethyl-S-(morpholinylcarbamoylmethyl)dithiophosphate (Morphothion)
Bismethylamido-phenylphosphate
O,O-Dimethyl-S-(benzensulphonyl)dithiophosphate
O,O-Dimethyl-(S and O)-ethylsulphinylethylthiophosphate
O,O-Diethyl-O-4-nitrophenylphosphate
O,O-Diethyl-S-(2,5-dichlorophenylthiomethyl)dithiophosphate (Phendapton)
Triethoxy-isopropoxy-bis(thiophosphinyl)disulphide
O,O-Diethyl-O-(4-methyl-coumarinyl-7)-thiosphosphate (Potasan)
2-Methoxy-4H-1,3,2-benzodioxaphosphorine-2-oxide
Octamethylpyrophosphoramide (Schradan)
Bis(dimethoxythiophosphinylsulphido)-phenylmethane
5-Amino-bis(dimethylamido)phosphinyl-3-phenyl-1,2,4-triazole (Triamiphos)
N-Methyl-5-(O,O-dimethylthiolphosphoryl)-3-thiavaleramide (Vamidothion) and
N,N,N',N'-Tetramethyldiamidofluorophosphate (Dimefox).

CARBAMIC ACID DERIVATIVES

1-Naphthyl-N-methylcarbamate (Carbaryl)
2-Butinyl-4-chlorophenylcarbamate
4-Dimethylamino-3,5-xylyl-N-methylcarbamate
4-Dimethylamino-3-tolyl-N-methylcarbamate (Aminocarb)
4-Methylthio-3,5-xylyl-N-methylcarbamate (Methiocarb)
3,4,5-Trimethylphenyl-N-methylcarbamate
2-Chlorophenyl-N-methylcarbamate (CPMC)
5-Chlor-6-oxo-2-norbornane-carbonitrile-O-(methylcarbamoyl)-oxime
1-(Dimethylcarbamoyl)-5-methyl-3-pyrazolyl-N,N-dimethylcarbamate (Dimetilan)
2,3-Dihydro-2,2-dimethyl-7-benzofuranyl-N-methylcarbamate (Carbofuran)
2-Methyl-2-methylthio-propionaldehyde-O-(methylcarbamoyl)oxime (Aldicarb)
8-Quinaldyl-N-methylcarbamate and its salts
Methyl 2-isopropyl-4-(methylcarbamoyloxy)carbanilate
m-(1-Ethylpropyl)phenyl-N-methylcarbamate
3,5-Di-tert.butyl-N-methylcarbamate
m-(1-Methylbutyl)phenyl-N-methylcarbamate
2-Isopropylphenyl-N-methylcarbamate
2-sec.Butylphenyl-N-methylcarbamate
m-Tolyl-N-methylcarbamate
2,3-Xylyl-N-methylcarbamate
3-Isopropylphenyl-N-methylcarbamate
3-tert.Butylphenyl-N-methylcarbamate
3-sec.-Butylphenyl-N-methylcarbamate
3-Isopropyl-5-methylphenyl-N-methylcarbamate (Promecarb)
3,5-Diisopropylphenyl-N-methylcarbamate
2-Chlor-5-isopropylphenyl-N-methylcarbamate
2-Chlor-4,5-dimethylphenyl-N-methylcarbamate
2-(1,3-Dioxolan-2-yl)phenyl-N-methylcarbamate (Dioxacarb)
2-(4,5-Dimethyl-1,3-dioxolan-2-yl)phenyl-N-methylcarbamate
2-(1,3-Dioxan-2-yl)phenyl-N-methylcarbamate
2-(1,3-Dithiolan-2-yl)phenyl-N-methylcarbamate
2-(1,3-Dithiolan-2-yl)phenyl-N,N-dimethylcarbamate
2-Isopropoxyphenyl-N-methylcarbamate (Arprocarb)
2-(2-Propinyloxy)phenyl-N-methylcarbamate
3-(2-Propinyloxy)phenyl-N-methylcarbamate
2-Dimethylaminophenyl-N-methylcarbamate 2-Diallylaminophenyl-N-methylcarbamate
4-Diallylamino-3,5-xylyl-N-methylcarbamate
 (Allyxicarb)
4-Benzothienyl-N-methylcarbamate
2,3-Dihydro-2-methyl-7-benzofuranyl-N-methylcarbamate
3-Methyl-1-phenylpyrazol-5-yl-N,N-dimethylcarbamate
1-Isopropyl-3-methylpyrazol-5-yl-N,N-dimethylcarbamate
 (Isolan)
2-(N',N'-Dimethylcarbamoyl)-3-methylpyrazol-5-yl-
 N,N-dimethylcarbamate
2-Dimethylamino-5,6-dimethylpyrimidin-4-yl-N,N-
 dimethylcarbamate
3-Methyl-4-dimethylaminomethyleneiminophenyl-N-
 methylcarbamate
3-Dimethylamino-methyleneiminophenyl-N-methyl-
 carbamate
1-Methylthio-ethylimino-N-methylcarbamate
 (Methomyl)
2-Methylcarbamoyloxyimino-1,3-dithiolane
5-Methyl-2-methylcarbamoyloxyimino-1,3-oxathiolane
2-(1-Methoxy-2-propoxy)phenyl-N-methylcarbamate
2-(1-Butin-3-yl-oxy)phenyl-N-methylcarbamate
3-Methyl-4-(dimethylamino-methylmercapto-methylene-
 imino)phenyl-N-methylcarbamate
1,3-Bis(carbamoylthio)-2-(N,N-dimethylamino)-propane
 hydrochloride
5,5-Dimethylhydroresorcinoldimethylcarbamate
2-[Propargylethylamino]-phenyl-N-methylcarbamate
2-[Propargylmethylamino]-phenyl-N-methylcarbamate
2-[Dipropargylamino]-phenyl-N-methylcarbamate
3-Methyl-4-[dipropargylamino]-phenyl-N-methyl-
 carbamate
3,5-Dimethyl-4-[dipropargylamino]-phenyl-N-methyl-
 carbamate
2-[Allyl-isopropylamino]-phenyl-N-methylcarbamate
 and
3-[Allyl-isopropylamino]-phenyl-N-methylcarbamate.

CHLORINATED HYDROCARBONS

γ-Hexachlorocyclohexane [Gammexane; Lindane;
 γHCH]
1,2,4,5,6,7,8,8-Octachloro-3α,4,7,7α'-tetrahydro-4,7-
 methyleneindane [Chlordan]
1,4,5,6,7,8,8-Heptachloro-3α,4,7,7α-tetrahydro-4,7-
 methyleneindane [Heptachlor]
1,2,3,4,10,10-Hexachloro-1,4,4α,5,8,8α-hexahydro-endo-
 1,4-exo-5,8-dimethanonaphthalene [Aldrin]
1,2,3,4,10,10-Hexachlor-6,7-epoxy-1,4,4α,5,6,7,8,8α,
 octahydro-exo-1,4-endo-5,8-dimethanonaphthalene
 [Dieldrin]
 ditto, endo-endo- [Endrin]
6,7,8,9,10,10-Hexachloro-1,5,5α,6,9,9α-hexahydro-6,9-
 methano-2,3,4 benzo[e]-dioxa-thiepene-3-oxide
 [Endosulfan]
Chlorinated camphor [Toxaphen]
Decachlorooctahydro-1,3,4-metheno-2H-cyclobuta[ed]
 pentalen-2-one
Dodecachloroctahydro-1,3,4-metheno-1H-cyclobuta-
 [cd]pentalene [Mirex]
Ethyl-1,1α,3,3α,4,5,5,5α,5α,6-decachloroctahydro-2-
 hydroxy-1,3,4-metheno-1H-cyclobuta[cd]pentalene-2-
 laevulinate
Bis(pentachloro-2,4-cyclopentadien-1-yl)
Dinoctone-o
1,1,1-Trichloro-2,2-bis(p-chlorophenyl)ethane [DDT]
Dichlorodiphenyl-dichlorethane [TDE]
Di(p-chlorophenyl)-trichloromethylcarbinol [Dicofol]
Ethyl-4,4'-dichlorophenylglycollate [Chlorobenzylate]
Ethyl-4,4'-dibromobenzylate [Bromobenzylate]
Isopropyl-4,4'-dichlorobenzylate
1,1,1-Trichloro-2,2 bis(p-methoxyphenyl)ethane
 [Methoxychlor]
Diethyl-diphenyl-dichlorethane
Decachloropentacyclo(3,3,2,0$^{2,6}$,0$^{3,9}$,0$^{7,10}$)decan-4-one
 [Chlordecon].

NITROPHENOLS AND DERIVATIVES 4,6-Dinitro-6-methylphenol Na salt [dinitrocresol]
Dinitrobuytlphenol-2,2',2''-triethanolamine salt
2-Cyclohexyl-4,6-dinitrophenol [Dinex]
2-(1-Methylheptyl)-4,6-dinitrophenyl-crotonate
 [Dinocap]
2 sec.-Butyl-4,6-dinitrophenyl-3-methyl-butenoate
 [Binapacryl]
2 sec.-Butyl-4,6-dinitrophenyl-cyclopropionate and
2 sec.-Butyl-4,6-dinitrophenyl-isopropyl-carbonate
 [Dinobuton].

VARIOUS SUBSTANCES

Sabadilla
Rotenon
Cevadin
Veratridin
Ryania
Pyrethrin
3-Allyl-2-methyl-4-oxo-2-cyclopenten-1-yl-chrys-
 anthemumate (Allethrin)
6-Chloropiperonyl-chrysanthemumate (Barthrin)
2,4-Dimethylbenzyl-chrysanthemumate (Dimethrin)
2,3,4,5-Tetrahydrophthalimidomethyl-chrysanthemumate
(5-Benzyl-3-furyl)-methyl-2,2-dimethyl-3-(2-methyl-
 propanyl)cyclopropanecarboxylate
Nicotine
*Bacillus thuringiensis* Berliner
Dicyclohexylcarbodiimide
Diphenyldiimide [azobenzene]
4-Chlorobenzyl-4-chlorophenylsulphide [Chlorbensid]
Creosote oil
6-Methyl-2-oxo-1,3-dithiolo-[4,5-b]-quinoxaline
 [Quinomethionat]
(I)-3-(2-Furfuryl)-2-methyl-4-oxocyclopent-2-enyl(I)-
 (cis-÷-trans) chrysanthemum-monocarboxylate
 [Furethrin]
2-Pivaloyl-indane-1,3-dione [Pindon]
2-Fluorethyl(4-bisphenyl)acetate
2-Fluoro-N-methyl-N(1-naphthyl)-acetamide
Pentachlorophenol and salts
2,2,2-Trichloro-N-(pentachlorophenyl)-acetimidoyl
 chloride
N'-(4-Chloro-2-methylphenyl)-N,N-dimethyl-
 formamidine (Chlorophenamidine)
4-Chlorobenzyl-4-fluorophenyl-sulphide (Fluorobenside)
5,6-Dichloro-1-phenoxycarbanyl-2-trifluoromethyl-
 benzimidazole (Fenozaflor)
Tricyclohexyl-tin hydroxide
2-Thiocyanatoethyl-lauric acid ester
β-Butoxy-β'-thiocyanatodiethyl-ether
Isobornyl-thiocyanatoacetate
p-Chlorophenyl-p-chlorobenzenesulphonate (Ovex)
2,4-Dichlorophenyl-benzenesulphonate
p-Chlorophenyl-benzenesulphonate (Fenson)
p-Chlorophenyl-2,4,5-trichlorophenylsulphone
 (Tetradifon)
p-Chlorophenyl-2,4,5-trichlorophenylsulphide (Tetrasul)
Methyl bromide
p-Chlorophenyl-phenylsulphone
p-Chlorobenzyl-p-chlorophenylsulphide (Chlorobenside)
4-Chlorophenyl-2,4,5-trichlorophenylazosulphide
2(p-tert.-Butylphenoxy-1-methylethyl-2-chlorethyl-
 sulphite
2(p-tert.-Butylphenoxy)cyclohexyl-2-propinyl-sulphite
4,4'-Dichloro-N-methylbenzenesulphonanilide
N-(2-Fluoro-1,1,2,2-tetrachlorethylthio)-methanesul-
 phonanilide
2-Thio-1,3-dithiolo-(4,5,6)quinoxaline (Thioquinox)
Chloromethyl-p-chlorophenylsulphone (lauseto new)
1,3,6,8-Tetranitrocarbazole and
Prop-2-ynyl-(4-t-butylphenoxy)-cyclohexylsulphite
 (Propargil).

FORMULATION EXAMPLES

Dusting agents

Equal parts of an active substance according to the invention and of precipitated silica are finely ground. Dusting agents preferably containing 1–6% of active substance can be manufactured therefrom by mixing with kaolin or talc.

Spraying powders (wettable powder)

In order to manufacture a spraying powder which is soluble in water, the following components are mixed and finely ground:

50 parts of active substance according to the present invention,
20 parts of Hisil (highly adsorbent silica),
25 parts of bolus alba (kaolin),
1.5 parts of sodium 1-benzyl-2-stearyl-benzimidazole-6,3'-disulphonate, and
3.5 parts of a reaction product of p-tert.octylphenol and ethylene oxide.

Emulsion concentrates (a) 40 parts of an active substance of formula (I) are mixed with 10 parts of a mixture of an anionic surface-active compound, preferably the calcium or magnesium salt of monolauryl-benzene-monosulphonic acid, and a non-ionic surface-active compound, preferably a polyethylene glycol ether of monosorbitol-laurate, and the whole is dissolved in a little xylene. The mixture is made up to 100 ccs. with xylene and a clear solution is thus obtained, which can be used as a spraying agent concentrate and which yields a stable emulsion on pouring into water.

(b) Easily soluble active substances can also be formulated as an emulsion concentrate according to the following instruction:

20 parts of active substance,
70 parts of xylene, and
10 parts of a mixture of a reaction product of an alkylphenol with ethylene oxide and calcium dodecylbenzenesulphonate are mixed. On dilution with water to the desired concentration, a sprayable emulsion results.

Granules (a) 7.5 g. of one of the active substances of formula (I) are dissolved in 100 ccs. of acetone and the acetone solution thus obtained is added to 92 g. of granular attapulgite (mesh width: 24/48 meshes/inch). The whole is well mixed and the solvent is stripped off in a rotary evaporator. Granules containing 7.5% of active substance are obtained.

(b) To manufacture 10% strength polymer granules, 1050 to 1100 g. of technical quality active substance of formula (I) are dissolved in 2 litres of trichlorethylene and sprayed in a fluidised bed granulator, under 1.5 atmospheres gauge spraying pressure, onto 9230 g. of initially introduced porous urea/HCHO granules. The solvent can be removed again by heating the fluidising air to about 50° C.

(c) To manufacture granules containing 7.5% of the additive, 770 g. of a solid technical grade active substance of formula (I), 500 g. of BaSO₄, 1000 g. of urea and 7730 g. of powdery porous polyacrylonitrile are pressed on a roll mill and subsequently broken up to the desired particle size.

In the examples which follow, parts by weight are described as parts.

EXAMPLE 1

2-(β-Methoxyethyl-methyl-amino)-phenol 138 parts of β-methoxyethyl-p-toluenesulphonate are added dropwise at 60° C. to 62 parts of 2-methylaminophenol, 83 parts of potassium iodide, 47.5 parts of pyridine and 420 parts by volume of dimethylformamide. The mixture is kept for 14 hours at 40° C., cooled and poured into 2200 parts of ice water containing 100 parts of calcined sodium carbonate. The product is isolated by extraction with ether and distilled in a high vacuum. Melting point 70° C./0.02 mm. Hg.

2-(β-Methoxyethyl-methyl-amino)-phenyl-N-carbamate 49 parts of 2-(β-methoxyethyl-methyl-amino)-phenol and 0.1 parts of triethylenediamine are dissolved in 100 parts by volume of hexane and treated dropwise with 17 parts of methylisocyanate. The mixture is kept for 14 hours at 50° C., diluted with 100 parts by volume of carbon tetrachloride, filtered and evaporated. The oily carbamate is obtained as the residue [Compound No. 47].

EXAMPLE 2

2-Methyl-β-methylmercaptoethyl-amino)-phenol 74 parts of β-chlorethyl-methyl-sulphide are added dropwise at 60° C., in a nitrogen atmosphere, to a mixture of 62 parts of 2-methylaminophenol, 17 parts of potassium iodide, 53 parts of pyridine and 100 parts by volume of dimethylformamide. The mixture is stirred for 24 hours at the above temperature and is then cooled to room temperature, mixed with 300 parts by volume of acetone and filtered after 10 minutes. The filtrate is evaporated in vacuo and the residue is dissolved in 1000 parts by volume of toluene, washed with water, dried and again evaporated. Oily 2-(methyl-β-methylmercaptoethyl-amino)-phenol is obtained as the residue.

2-(Methyl-β-methylmercaptoethyl-amino)-phenyl-N-methylcarbamate

2 - (Methyl - β-methylmercaptoethyl-amino)-phenol is reacted with methylisocyanate in the presence of diethylenediamine analogously to the process described in Examples 1–3. 2 - (Methyl - β - methylmercaptoethyl-amino)-phenyl-N-methylcarbamate is obtained as a viscous oil [Compound No. 53].

NMR-spectrum: δ (CDCl₃) 2.08 (s, 3H, S-C$\underline{H}_3$), 2.78 (s, N-C$\underline{H}_3$), 2.87 (d, J=5 Hz, NH-C$\underline{H}_3$), 2.4–3.4 (m, N-C$\underline{H}_2$-C$\underline{H}_2$-S-CH₃), approx. 5.2 (b, 1H, N$\underline{H}$CH₃), 6.8–7.3 (m, 4H, aromat. H).

EXAMPLE 3

2-(β-Cyanethyl-methyl-amino)-phenol 5 parts of copper-I chloride followed, at 75° C., by 63.5 parts of acrylonitrile in portions, were added to a solution of 123 parts of 2-methylaminophenol in 400 parts by volume of glacial acetic acid. The mixture is stirred for 14 hours at 75° C. and is then poured onto a mixture of 700 parts of calcined sodium carbonate and 4000 parts of ice and water. The oily product is isolated by extraction with toluene.

2-(β-Cyanethyl-methyl-amino)-phenyl-N-methyl-carbamate 46 parts of methylisocyanate are added dropwise at 32–37° C., with mild cooling, to a solution of 87 parts of crude 2-(β-cyanethyl-methyl-amino)-phenol and 0.5 part of triethylenediamine in 300 parts by volume of carbon tetrachloride. The solution is kept at 40° C. for 14 hours and evaporated. The residue is treated with a mixture of 70 parts by volume of concentrated hydrochloric acid and 150 parts of water and the mixture is extracted with toluene. The aqueous solution containing hydrochloric acid is neutralised with sodium hydroxide solution. The product is isolated by extraction with ethyl acetate. It crystallises on standing. Melting point 52–55° C. [Compound No. 57].

EXAMPLE 4

3-(β-Chlorallyl-isopropylamino)phenol 120 parts of 2-chlorallyl chloride are added dropwise at 40° C., in a nitrogen atmosphere, to a suspension of 122 parts of 3-isopropylaminophenol in a solution of 58 parts of calcined sodium carbonate and 16 parts of potassium iodide in 500 parts by volume of water. The mixture is stirred for 14 hours at 76° C. The product is taken up in ether. The residue obtained after drying and evaporating the solvent is crystallised from cyclohexene. Melting point 124–128° C.

3-(β-Chlorallyl-isopropylamino)-phenyl-N-methylcarbamate

By reaction of 90 parts of 3-(2-chlorallylisopropylamino)phenol with 34 parts of methylisocyanate in ethyl acetate in the presence of 0.5 part of triethylenediamine at 45° C. for 14 hours. Melting point 88–92° C. (after crystallisation from cyclohexane) [Compound No. 82].

EXAMPLE 5

3-(Cyanomethyl-isopropylamine)phenol 167 parts of iodacetonitrile are added dropwise at 60° C., in a nitrogen atmosphere, to a solution of 122 parts of 3-isopropylaminophenol in 107 parts of 2,6-lutidine and 250 parts by volume of dimethylformamide. The mixture is stirred for 14 hours at 60° C., evaporated in a high vacuum, and the residue diluted with 1000 parts by volume of ether. The ether solution is washed with water, dried over anhydrous sodium sulphate, filtered and evaporated. 135 parts of 3 - (cyanomethyl - isopropylamino) phenol are obtained as a dark oil.

3-(Cyanomethyl-isopropylamino)phenyl-N-methylcarbamate 3-(Cyanomethyl-isopropylamino)phenyl - N - methylcarbamate is obtained as described in the preceding examples from 3-(cyanomethyl-isopropylamino)-phenol by reaction with methylisocyanate in ethyl acetate at 40° C. It is obtained as a dark oil [Compound No. 76].

EXAMPLE 6

4-[Bis(γ-chlorallyl)amino]-3-methyl-phenol 123 parts of 4-amino-3-methyl-phenol are suspended in 500 parts of water in a nitrogen atmosphere and 133 parts of calcined sodium carbonate and 8.5 parts of potassium iodide are added. 278 parts of a technical mixture of cis- and trans-1,3-dichloropropene are added dropwise to this suspension at 50° C., whilst stirring. The mixture is stirred for 24 hours at 50° C. The oily product is dried, filtered and evaporated. Oily 4-[bis(γ-chlorally)amino]-3-methyl-phenol is obtained as the residue.

4-[Bis(γ-chlorally)amino]-3-methyl-phenyl-N-methylcarbamate 1630 parts of 4-[bis(N-chlorallyl)amino] - 3 - methylphenol and 5 parts of triethylenediamine are dissolved in 2000 parts by volume of carbon tetrachloride and treated dropwise with a total of 376 parts of methylisocyanate. The solution is kept for 14 hours at 40° C., initially by external cooling and subsequently by application of heat. 4-[Bis(γ-chlorallyl)amino]-3-methyl-phenyl-N - methylcarbamate, which gradually crystallises, is obtained by evaporation in vacuo. After one crystallisation from toluene-hexane, the product melts at 72–78° C. [Compound No. 1].

Hydrochloride.—An aqueous solution of the hydrochloride is obtained by dissolving the product in hydrochloric acid diluted to half strength.

Acid sulphate.—3.3 parts of 4-[bis(γ - chlorallyl] - 3 - methylphenyl-N-methylcarbamate are introduced into a mixture of 2 parts of concentrated sulphuric acid and 8.4 parts of water. On gentle warming, an aqueous solution of the acid sulphate is obtained.

EXAMPLE 7

4-[Bis(β-methoxyethyl)amino]-3-methyl-phenol

A stirred mixture of 62 parts of 4-amino-3-methylphenol, 83 parts of potassium iodide, 104 parts of pyridine and 400 parts by volume of dimethylformamide is treated at 60° C. with 304 parts of β-methoxyethyl-p-toluene-sulphonated added in portions. After 17 hours' reaction at 90° C. the mixture is poured onto 100 parts of calcined sodium carbonate and 1000 parts of ice water. The product is taken up in ether, the solution is dried, filtered and evaporated. The residue is distilled in a high vacuum. Boiling point 135° C./0.02 mm. Hg.

4-[Bis(3-methoxyethyl)amino]-3-methyl-phenyl-N-methyl-carbamate 36 parts of 4 - [bis(β-methoxyethyl)amino]-3-methylphenol and 0.2 part of triethylenediamine are dissolved in 200 parts by volume of carbon tetrachloride and treated dropwise with 10 parts of methylisocyanate. The solution is stirred for 14 hours at 40° C. and then evaporated. 4-[Bis(β-methoxyethyl)amino] - 3 - methyl-phenyl-N-methylcarbamate is obtained as the residue [Compound No. 10].

EXAMPLE 8

3,5-Dimethyl-4(β-cyanethyl-methylamino)phenol 70 parts of acrylonitrile are added dropwise at 75° C., in a nitrogen atmosphere, to a stirred mixture of 151 parts of 3,5-dimethyl-4-methylamino-phenol, 400 parts by volume of acetic acid and 10 parts of copper-I chloride. The solution is stirred for 14 hours at 75° C., cooled, diluted with 1500 parts by volume of ether and washed with water. The ether solution is dried over anhydrous sodium sulphate, filtered and evaporated. The crystalline residue is triturated with methanol and filtered. Melting point 105–108° C.

3,5-Dimethyl-4(β-cyanethyl-methylamino)phenyl-N-methylcarbamate 47 parts of 3,5-dimethyl-4(β-cyanethyl-methylamino)phenol are dissolved in 150 parts by volume of ethyl acetate and treated with 0.4 part of triethylenediamine and, at 40° C., with 18 parts of methylisocyanate added in portions. The solution is kept for 14 hours at 40° C. and is evaporated. The residue crystallises after some time. It is triturated with hexane and filtered off. Melting point 63–67° C. [Compound No. 26].

EXAMPLE 9

A dusting agent manufactured using talc as the base and containing active susbtance No. 47 is applied to filter paper in concentrations of 200, 100, 50, 25, 12 and 6 mg. of active substance per m.². Groups of 5 test animals of the type indicated below are placed on the treated substrates. After 24 hours the experiment is evaluated, the following limiting concentrations for 100% mortality being ascertained:

| | Mg./m.² |
|---|---|
| *Phyllodromia germanica* | 12 |
| *Periplaneta americana* | 25 |
| *Blatta orientalis* | 100 |
| *Tenebrio molitor* (imago) | 100 |
| *Dermestes frishchii* (imago) | 100 |
| *Acheta domesticus* | 50 |

EXAMPLE 10

Potted young mallow plants (*Malva sylvestris*) having approximately 6 leaves are dipped into aqueous dispersions of the active substances No. 1, 3, 8, 9, 16, 19, 24, 38, 47 and 57 containing 800 p.p.m. of active substance and are then allowed to dry. The plants are infested with groups of 5 larvae of *Orgyia gonostigma* in the L–3 stage.

After 5 days the experiment is evaluated, with 100% mortality of the test animals being established for each of the active substances.

EXAMPLE 11

Groups of 5 L-2 larvae of *Prodenia litura* are placed, together with a leaf of *Malva sylvestris* treated as in Example 10, into a covered Petri dish in which the moisture in the air is maintained with a moistened cottonwool pad.

In this dilution test leaves which were dipped in solutions of 800, 400, 200 and 100 p.p.m. are used.

For active substance No. 1, the mortality after 2 days was

| | Percent |
|---|---|
| At 800 p.p.m. | 100 |
| At 400 p.p.m. | 100 |
| At 200 p.p.m. | 100 |
| At 100 p.p.m. | 100 |

EXAMPLE 12

The aphicidal action of the active substances No. 8, 24, 47 and 64 was determined for *Aphis fabae* (S) using *Vicia faba* as the test plant. Aqueous emulsions of the active substances were used in a concentration series of 800–100 p.p.m.

For the contact test, the solution was sprayed onto the infested plant from all sides by means of a chromatography atomiser. The evaluation was carried out after 2 days by counting the dead animals with a hand magnifying glass.

Each of the 4 preparations achieved complete mortality at concentrations of 800, 400, 200 and 100 p.p.m.

EXAMPLE 13

Young mallow plants were dipped into an active substance solution of a certain concentration and allowed to dry. The leaves were then plucked and placed in Petri dishes together with a moistened cottonwool pad. For the contact and bait test, 5 larvae of *Spodopter littoralis* in the L-2 stage were placed on the pretreated leaves and examined for mortality after 24 and 48 hours. If complete destruction was found the first time, a new infestation, but using new leaves of the same mallow plant, was carried out.

The following mortalities were achieved:

| | After 24 hours, percent | | | | After 48 hours, percent | | | |
|---|---|---|---|---|---|---|---|---|
| Compound number | 1 | 8 | 20 | 24 | 1 | 8 | 20 | 24 |
| Concentration, p.p.m.: | | | | | | | | |
| 800 | 100 | 100 | 100 | 100 | 100 | 100 | 100 | 100 |
| 400 | 100 | 100 | 100 | 100 | 100 | 100 | 80 | 100 |
| 200 | 100 | 100 | 100 | 100 | 100 | 100 | 60 | 100 |
| 100 | 100 | 80 | (¹) | 80 | 100 | 60 | (¹) | 80 |

¹ Not tested.

EXAMPLE 14

Action against Acarina (A) *Rhipicephalus bursa*.—5 adult, hungry ticks are counted out into a test tube and dipped for 1–2 minutes into 2 ml. of an aqueous emulsion from a dilution series with 100, 50, 10 and 1 p.p.m. of test substance. The test tube is then closed with a standardised cottonwool pad and inverted so that the active substance emulsion is taken up by the cottonwool. The evaluation takes place after 2 weeks.

Two repeats are run for each experiment.

Compound No. 57 achieved 100% mortality at 10 p.p.m.

Compound No. 59 achieved 100% mortality at 50 p.p.m.

(B) *Boophilus microplus* (larvae).—A test series and two repeats in each case using about 10–20 larvae were carried out with a similar dilution series. 100% mortality was found at the following limiting concentrations after 2 weeks:

| Compound No.: | p.p.m. |
|---|---|
| 1 | 10 |
| 8 | 5 |
| 38 | 10 |
| 57 | 10 |
| 59 | 10 |

(C) *Dermanyssus gallinae*.—The test is carried out analogously to Method (A) with about 10–20 mites. The evaluation takes place after 72 hours.

100% mortality was achieved at the following limiting concentrations:

| Compound No.: | p.p.m. |
|---|---|
| 1 | 1 |
| 38 | 10 |
| 53 | 50 |
| 57 | 10 |

What is claimed is:

1. A compound of the formula

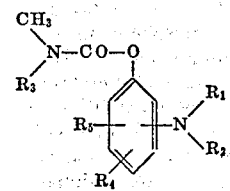

in which $R_1$ represents $C_1$–$C_5$-alkyl, $C_3$–$C_5$-alkenyl or $C_3$–$C_5$-alkinyl or has the same meaning as $R_2$, $R_2$ represents $C_1$–$C_4$-alkyl substituted by a nitrile group, $R_3$ represents hydrogen or methyl, and $R_4$ and $R_5$ which may be the same or different, each represents hydrogen or $C_1$–$C_5$-alkyl, or an acid addition salt thereof.

2. A compound as claimed in claim 1 having the formula

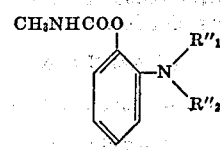

wherein $R''_1$ represents $C_1$–$C_4$-alkyl and $R''_2$ represents $C_1$–$C_4$-alkyl substituted by a nitrile group.

3. 2-(β-cyanethyl-methyl-amino)-phenyl - N - methylcarbamate, as claimed in claim 2.

4. 2-(cyanmethyl-ethyl-amino)-phenyl - N - methylcarbamate as claimed in claim 2.

5. 2-(β-cyanethyl-ethyl-amino)-phenyl - N - methylcarbamate as claimed in claim 2.

6. A compound according to claim 1 having the formula

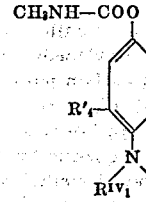

in which $R^{IV}_1$ represents $C_1$–$C_4$-alkyl or has the same meaning as $R^{IV}_2$, $R^{IV}_2$ represents $C_1$–$C_4$-alkyl substituted by a nitrile group and $R'_4$ and $R'_5$, which may be the same or different, each represents hydrogen, methyl, ethyl or isopropyl.

7. 4-[bis(β-cyanethyl)amino] - 3 - methylphenyl-N-methylcarbamate, as claimed in claim 6.

8. 4-[bis(β-cyanethyl)amino] - 3,5 - dimethylphenyl-N-methylcarbamate, as claimed in claim 6.

9. A compound according to claim 1 having the formula

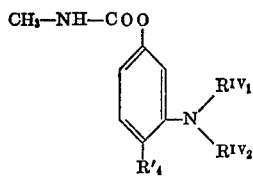

in which $R^{IV}_1$ represents $C_1$–$C_4$-alkyl or has the same meaning as $R^{IV}_2$, $R^{IV}_2$ represents $C_1$–$C_4$-alkyl substituted by a nitrile group and $R'_4$ represents hydrogen, methyl, ethyl or isopropyl.

10. 3-[bis(β-cyanethyl)-amino] - 4 - methyl-phenyl-N-methylcarbamate as claimed in claim 9.

References Cited

UNITED STATES PATENTS

| | | | |
|---|---|---|---|
| 3,453,316 | 7/1969 | Heiss et al. | 260—479 |
| 3,676,486 | 7/1972 | Nikles | 260—479 |
| 3,655,730 | 4/1972 | Nikles | 260—479 |
| 3,329,702 | 7/1967 | Rohr | 260—465 |

LEWIS GOTTS, Primary Examiner

D. H. TORRENCE, Assistant Examiner

U.S. Cl. X.R.

260—463, 479 C; 424—300